United States Patent Office 2,877,200
Patented Mar. 10, 1959

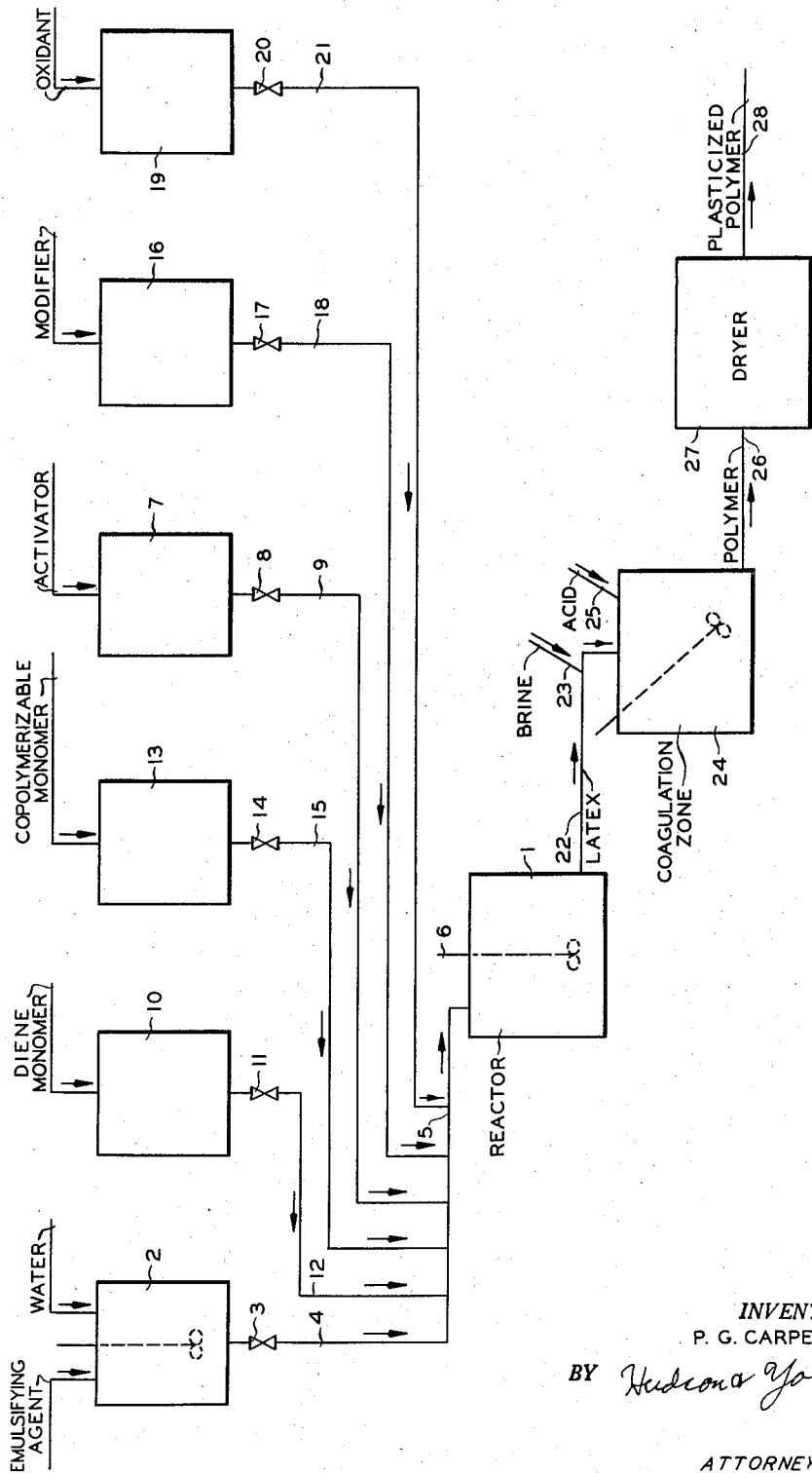

2,877,200

PROCESS OF PLASTICIZING HIGH MOONEY SYNTHETIC RUBBER WITH A LOW MOONEY SYNTHETIC RUBBER

Paul G. Carpenter, Bartlesville, Okla., assignor to Phillips Petroleum Company, a corporation of Delaware Application December 24, 1953, Serial No. 400,310

14 Claims. (Cl. 260—33.6)

This invention relates to a novel process for plasticizing synthetic rubber. In one of its aspects it relates to a novel method for preparing a plasticized and readily worked synthetic rubber product and the product of such method.

Synthetic rubber, as referred to herein, is intended to include synthetic rubber-like materials made by the emulsion polymerization of conjugated dienes or substituted derivatives thereof such as the haloprenes, either alone or in admixture with each other or with monomers copolymerizable therewith. The term polymer as used herein includes copolymers as well as products of polymerization of a single monomer.

Synthetic rubbers having a high Mooney value are well known in the art and will be referred to herein as high Mooney rubbers. Mooney value is a measurement of shearing viscosity and is related to the mean absolute viscosity of the sample. For a complete discussion of Mooney value see ASTM standard D-927-49T and the article by Melvin Mooney, Industrial and Engineering Chemistry, Analytical Edition, 6, 1947-1951 (1934.)

By a high Mooney value, I mean a synthetic rubbery material having a Mooney value (ML-4) of at least 70. By a low Mooney rubber, I mean a synthetic polymeric material having a Mooney value (ML-4) of 20 or less and this includes liquid polymers. The Mooney value (ML-4) is determined at 212° F. by ASTM (American Society for Testing Materials) standard D-927-49T. By high Mooney recipe, I mean a recipe which will upon polymerization and coagulation produce a rubber having a high Mooney value. By high Mooney latex, I mean the resulting latex from polymerizing a high Mooney recipe. By low Mooney recipe, I mean a recipe for a rubber containing sufficient modifier that the resulting polymer will have a low Mooney value. A low Mooney latex is the resulting latex produced by polymerizing a low Mooney recipe.

High Mooney rubbers are, in general, high molecular weight synthetic rubbers. After vulcanizing they have high tensile strength, high resistance to shear, and high resistance to abrasion among other desirable properties. These rubbers are particularly valuable in tire, belt, tube, and conduit stocks. On the other hand, these rubbers are extremely difficult to compound and have, for that reason, found only limited use even in these above said rubber stocks. In order to overcome these compounding difficulties due to high shearing resistance of high Mooney rubbers, plasticizers are added and mixed with the rubber. Since these high Mooney rubbers are difficult to work, it is extremely difficult to blend the plasticizers with the rubber by conventional means such as milling. That is, the plasticizer is of little value until it has been blended with the rubber. Since these high Mooney rubbers have particular value in vulcanized products, it is desirable that the plasticizer also be vulcanizable. In the case of very high Mooney rubbers, say ML-4 value of 90 or above, relatively large volumes of plasticizers are required and unless the plasticizer is vulcanizable the finished vulcanized product might be tacky and subject to bleeding. For this reason, the preferred plasticizing agent with these rubbers is a low Mooney and preferably a liquid polymer which generally is prepared using the same monomers in a low Mooney recipe as are used in preparing the high Mooney rubber.

As has hereinbefore been indicated, these high Mooney rubbers would have many valuable uses if the compounding difficulties can be overcome. These polymers having high raw Mooney values retain their high tensile strength and high abrasion resistance even after being modified by the use of plasticizers and being compounded.

I have found that a highly plasticized high Mooney, vulcanizable synthetic rubber can be conveniently prepared in a single reactor by polymerizing a high Mooney rubber recipe to at least 90 percent conversion and then polymerizing a low Mooney recipe in the presence of the high Mooney latex.

An object of this invention is to provide a method of plasticizing a high Mooney rubber. Another object of this invention is to provide a method for preparing a rubbery compound having the desirable properties of a high Mooney rubber and still being easy to compound on a mill. Still another object of this invention is to provide a vulcanizable rubbery compound which will, after vulcanization, have the said desirable properties of high Mooney rubbers as aforesaid.

As has been said, the synthetic rubbery compounds with which this invention is concerned are polymers prepared by polymerization or copolymerization of monomers of the conjugated dienes or their derivatives either alone, with each other, or with other monomers copolymerizable therewith. The conjugated dienes generally employed are preferably those which contain from four to six, inclusive, carbon atoms per molecule, but those containing more carbon atoms per molecule, e. g., eight can also be used. These compounds include 1,3-butadiene, isoprene, piperylene, methylpentadiene, 2,3-dimethyl-1,3-butadiene, the haloprenes such as chloroprene and others. Furthermore, various alkoxy, such as methoxy and ethoxy, and cyano derivatives of these conjugated dienes can also be employed, i. e. 2-methoxybutadiene and 1-cyanobutadiene.

Monomers polymerizable with the conjugated dienes are such as styrene, alpha-methylstyrene, other alkyl substituted styrenes, acrylonitriles, methacrylonitriles, acrylates such as methyl acrylate, ethyl acrylate, and methyl methacrylate, vinyl chloride, vinylidene chloride, vinyl acetate, methyl vinyl ketone, methyl isopropenyl ketone, methyl vinyl ether, carboxy-containing monomers such as acrylic acid, methacrylic acid, crotonic acid, alpha and beta ethyl-, propyl-, butyl-, amyl-, hexyl-, heptyl, and octylacrylic acids, phenylacrylic acids and the like, pyridine and quinoline derivatives containing at least one vinylidene group such as 2-vinylpyridine, 3-vinylpyridine, 4-vinylpyridine, 2,4,6-trimethyl-5-vinylpyridine, 3,4,5,6-tetramethyl-2-vinylpyridine, 3-ethyl - 5 - vinylpyridine, 2-methyl-5-vinylpyridine, 2,6-diethyl-4-vinylpyridine, 3-dodecyl-2,4-divinylpyridine, 2,6-diphenyl - 3 - vinylpyridine, 2,4-divinylpyridine, 6-phenyl-3-vinylpyridine, 2,4-divinylpyridine, 2,3-divinylpyridine, 2,4-divinyl-5-ethylquinoline and the like.

The polymerizable conjugated dienes as well as derivatives thereof are well known in the art as are monomers copolymerizable therewith. High Mooney and low Mooney polymerization recipes are equally well known to those skilled in the art and no discussion of polymerization recipes need be made here. The conjugated dienes when polymerized either alone or with copolymerizable materials in aqueous emulsion will form a very high molecular weight and unprocessible material unless modified. While there are many known modifiers in the art, the mercaptans are the most widely used modifiers in the rubber industry and the tertiary mercaptans are especially adapted for this purpose.

As has been hereinbefore indicated, the polymerization of monomeric material in aqueous emulsion is well known in the art. In effecting such emulsion polymerization of a monomeric material, particularly when a batch-type or semi-batch type operation is carried out, the reactor is usually first charged with the aqueous medium, which contains the desired emulsifying agent, and the monomeric material is then added while agitating the contents. At the same time a reaction modifier, such as a mercaptan, is also included, usually in solution in at least a part of the monomeric material. An activator solution and an oxidant are separately added to the reaction mixture, and then the polymerization proceeds. The activator solution can be, and usually is, incorporated in the aqueous medium prior to the addition of the monomeric material, and then the oxidant is added as the last ingredient. Sometimes, however, satisfactory polymerization results can be obtained when the oxidant is incorporated prior to addition of the activator which would then be added as the last ingredient. It is also sometimes the practice to add portions of one or the other of the activator solution and oxidant intermittently, or continuously, during the course of the reaction.

The high Mooney polymers of the greatest commercial value and the preferred polymers of my invention are homopolymers of 1,3-butadiene, chloroprene, and copolymers of 1,3-butadiene with styrene, 2-methyl-5-vinylpyridine, 2-vinyl-5-ethylpyridine, or acrylonitrile.

To carry out the process of this invention, a high Mooney synthetic rubber is first prepared by polymerizing in aqeous emulsion a conjugated diene either alone or with one or more monomers copolymerizable therewith. Polymerization is continued until a conversion is reached of at least 90 percent and preferably higher to obtain a polymeric material which has exceptionally good physical properties. Also from an economic view, it is desirable to utilize as much of the high Mooney recipe for high Mooney rubber as is practical. The polymer thus prepared can be unmodified or a modifier can be employed so long as the polymer has a Mooney value of at least 70 and preferably 80 or higher. The amount of modifier employed is dependent upon the polymerization system but in any case will usually not exceed one part by weight per 100 parts monomers and will generally be less than 0.7 part by weight per 100 parts monomers.

After the high Mooney polymer has been prepared, there is introduced into the reactor containing the latex of this polymer additional monomeric material together with a modifier and other materials necessary to effect polymerization such as water, emulsifier, activator, initiator, etc. The ingredients of the second-step are used in such proportions that if polymerized in the absence of the latex from the first step, a polymer of less than 20 Mooney would be obtained. Polymerization is then continued and the low Mooney polymer formed serves as a plasticizer for the high Mooney polymer previously prepared. Any unreacted monomeric material from the first step becomes a monomeric ingredient in the second step and is utilized in this polymerization.

Monomeric materials employed in the second step of this process can be the same or different from those employed in the first step. The emulsifier, activator, and initiator ingredients are generally the same as those used in the first step, however, this is not required so long as the materials used are compatible in the system and produce the desired results. Polymerization in the second step is generally continued until 70 percent or more of the added monomeric material is polymerized.

The amount of modifier employed must be sufficient to produce a low Mooney polymer during the last stage of the polymerization. The amount of modifier will depend to a certain extent upon the polymerization system but will generally be in the range between 1 and 25 parts by weight per 100 parts of monomers added in the second step and preferably at least three parts by weight in order to insure a liquid polymer.

In one embodiment of this invention, a high Mooney copolymer of a conjugated diene with a vinyl compound such as styrene is prepared in the first step of the process and a liquid homopolymer of a conjugated diene such as butadiene, which serves as the vulcanizable plasticizer, is prepared in the second step. Any unreacted vinyl compound remaining from the first step will be utilized thus eliminating the need for removing it from the system prior to coagulation of the latex and to this extent a copolymer is formed. It is obvious that this operating advantage can also be utilized with other combinations of monomeric materials especially where one of the monomeric materials is high boiling and would otherwise have to be removed by steam stripping.

I will further describe my invention by referring to the attached drawing.

Figure 1 is a block diagram showing the flow of materials when using the process of my invention.

Referring to the figure, the aqueous medium usually containing a suitable emulsifying agent is added to the reactor 1 from storage vessel 2 via valve 3 and conduits 4 and 5. The agitator 6 is started and activator solution from storage vessel 7 is added via valve 8 and conduits 9 and 5. The conjugated diene monomer (butadiene) from storage vessel 10 and the copolymerizable monomer (styrene) are simultaneously added to the reactor 1 via valve 11 and conduits 12 and 5 and valve 14 and conduits 15 and 5 simultaneously. At the same time, the modifier is added to the reactor from storage vessel 16 via valve 17 and conduits 18 and 5. After these ingredients have been added and mixed, an oxidant is added to the reactor from vessel 19 via valve 20 and conduits 21 and 5. Other ingredients as desired can be added to the reactor. The polymerization then proceeds. Sufficient time is allowed for at least 90 percent of the original monomers to be polymerized (90 percent conversion). The ratio of ingredients will depend upon the particular recipe. The recipe choosen will be one which will produce a rubber having a Mooney of 70 or higher. After the conversion has proceeded to the desired degree (90 percent or higher) additional conjugated diene monomer, emulsifier, water, modifier, activator, oxidant and other ingredients are added generally in the same order as they were added in the first step. The proportions of materials added in this second step are so selected that a liquid polymer will result from polymerization of the monomeric material. Polymerization is then continued until at least 70 percent conversion of the second monomer charge is attained.

The latex from reactor 1 passes through conduit 22 where it is creamed with a brine solution from conduit 23 and passes to coagulation vessel 24. Acid from conduit 25 is added to vessel 24 and the polymer is coagulated. The coagulated polymer is separated from the aqueous phase and passes via conduit 26 to drier 27. The dried polymer can be processed in the usual manner without the addition of any plasticizer.

It should be understood that the sequence of adding the ingredients to the reactor and the method of coagulation are optional and any method known to the art can be used. If a homopolymer is prepared in the first step, then vessel 13 would not be required. It is again pointed out, that even where a high boiling copolymerizable monomer is used, there is no need for steam stripping, since any unreacted monomer from the first step would be used up in the second step.

The following example is given wherein a high Mooney butadiene-styrene copolymer is first produced followed by a liquid polymer recipe. The resulting polymer had a Mooney value (ML-4) of 44.

Example 1

The following ingredients were charged to a reactor and polymerization effected at 41° F.

| | Parts by weight |
|---|---|
| Water | 200 |
| Butadiene | 76 |
| Styrene | 24 |
| Rosin soap [1] | 5 |
| KOH | 0.1 |
| KCl | 0.5 |
| Daxad 11 [2] | 0.2 |
| Versene Fe-3 [3] | 0.1 |
| $K_4P_2O_7$ | 0.177 |
| $FeSO_4 \cdot 7H_2O$ | 0.14 |
| Diisopropylbenzene hydroperoxide | 0.097 |
| tert-Dodecyl mercaptan | 0.2 |

Booster at 55 percent conversion:

| | Parts by weight |
|---|---|
| Water | 5 |
| $K_4P_2O_7$ | 0.177 |
| $FeSO_4 \cdot 7H_2O$ | 0.14 |
| Diisopropylbenzene hydroperoxide | 0.097 |
| tert-Dodecyl mercaptan | 0.4 |

[1] A disproportionated hydrogenated rosin soap containing dehydro-, dihydro-, and tetrahydroabietic acids.
[2] Sodium salt of condensed alkyl aryl sulfonic acid.
[3] Tetra sodium salt of ethylenediamine tetracetic acid.

This charge reacted to 96 percent conversion in 15 hours to give a polymer product having a Mooney value (ML–4) of 84. At this stage the following ingredients were charged to the reactor:

| | Parts by weight |
|---|---|
| Water | 51.4 |
| Butadiene | 25.7 |
| Rosin soap [1] | 1.28 |
| KOH | 0.026 |
| KCl | 0.128 |
| Daxad 11 [1] | 0.026 |
| $K_4P_2O_7$ | 0.09 |
| $FeSO_4 \cdot 7H_2O$ | 0.072 |
| Diisopropylbenzene hydroperoxide | 0.05 |
| tert-Dodecyl mercaptan [2] | 3.85 |

[1] As previously described.
[2] Mercaptan charged at the rate of 15 parts per 100 parts monomer.

Polymerization was continued for 10 additional hours or a total time, for both stages of the run, of 25 hours. At this time 79 percent of the butadiene charged with the final quantity of ingredients had reacted. The final product had a Mooney value (ML–4) of 44.

Those skilled in the art will see many modifications which can be made in the recipes, methods and equipment without departing from the scope of my invention.

I claim:

1. A process for plasticizing a synthetic rubber prepared from a conjugated diene by polymerization having a Mooney ML–4 value at 212° F. of at least 70 in the absence of the plasticizer which comprises polymerizing to at least 70 percent conversion in the presence of a latex of said synthetic rubber a second conjugated diene to form a polymer which would have a Mooney ML–4 value at 212° F. of not more than 20 in the absence of any other rubber; coagulating the resulting polymers and recovering the resulting plasticized material.

2. The process of claim 1 wherein the conjugated diene in both instances is 1,3-butadiene.

3. The process of claim 1 wherein the conjugated diene in both instances is chloroprene.

4. A process for producing a plasticized synthetic rubber, the said process comprising charging a polymerization zone with a polymerization formula comprising a conjugated diene and a mercaptan in aqueous emulsion the mercaptan being present in an amount less than 0.7 part by weight mercaptan per 100 parts of the monomeric material in the said formula; polymerizing the monomeric material to at least 90% conversion, the polymerization recipe being for a rubber having a Mooney ML–4 value at 212° F. of at least 70; adding to the resulting latex a polymerization formula comprising a conjugated diene and a mercaptan in aqueous emulsion, the mercaptan being present in an amount from 1 to 25 parts by weight per 100 parts of monomer in the said second formula; continuing the polymerization until a conversion of at least 70 percent of the second added monomer is reached, said second formula being for a polymer of a Mooney ML–4 value at 212° F. no greater than 20; coagulating the resulting polymer; and recovering the resulting plasticized polymer.

5. The process of claim 4, wherein the mercaptan in the second added formula is at least 3 parts by weight per 100 parts of the second added monomer.

6. The process of claim 5 wherein the mercaptan is a tertiary mercaptan.

7. A process for producing a plasticized synthetic rubber, the said process comprising charging a polymerization zone with a polymerization formula comprising a conjugated diene monomer and at least one copolymerizable monomer; copolymerizing the monomeric material to at least 90 percent conversion, the polymerization being an aqueous emulsion recipe for a rubber having a Mooney ML–4 value at 212° F. of at least 70; adding a second polymerization formula comprising a conjugated diene to the polymerization zone, the second formula being for a polymer of a Mooney ML–4 value at 212° F. no greater than 20; continuing the polymerization until at least 70 percent conversion of the second added conjugated diene is reached and thereby using up any unreacted copolymerizable monomer from the first polymerization step; coagulating the polymeric material in the resulting latex; and recovering the coagulated polymer.

8. The process of claim 7 wherein both said conjugated dienes are 1,3-butadiene and the copolymerizable monomer is styrene.

9. The process of claim 7 wherein both said conjugated dienes are 1,3-butadiene and the copolymerizable monomer is 2-methyl-5-vinylpyridine.

10. The process of claim 7 wherein both said conjugated dienes are 1,3-butadiene and the copolymerizable monomer is 2-vinyl-5-ethylpyridine.

11. The process of claim 7 wherein both said conjugated dienes are 1,3-butadiene and the copolymerizable monomer is acrylonitrile.

12. The process of claim 7 wherein the polymer having a Mooney value not greater than 20 is a liquid polymer.

13. In the process of plasticizing a synthetic rubber prepared by charging a polymer recipe to a reactor, the recipe consisting of 200 weight parts water, 76 weight parts butadiene, 24 weight parts styrene, 5 weight parts of a soap of a disproportionated rosin containing dehydro-, dihydro-, and tetrahydroabietic acids, 0.1 weight part, potassium hydroxide, 0.5 weight part potassium chloride, 0.2 weight part of a sodium salt of condensed alkyl aryl sulfonic acid, 0.1 weight part of a tetra sodium salt of ethylene diamine tetracetic acid, 0.1 weight part potassium pyrophosphate, 0.177 weight part of ferric sulfate hydrate, 0.097 part diisopropylbenzene hydroperoxide and 0.2 weight part tert-dodecyl mercaptan; polymerizing the thus charged ingredients at 41° F. until 55 percent conversion; charging to the said reactor containing the resulting polymerized material an additional 5 weight parts water, 0.177 weight part potassium pyrophosphate, 0.14 weight part ferric sulfate hydrate, 0.097 weight part diisopropylbenzene hydroperoxide, and 0.4 weight part of tert-dodecyl mercaptan; continuing the polymerization at said temperature to at least 90 percent conversion thereby obtaining a polymer which would have a Mooney ML–4 value at 212° F. of at least 70; the improvement comprising charging to the reactor in the presence of the thus produced polymer latex a polymerization recipe consisting of 51.4 weight parts water, 25.7 weight parts butadiene, 1.28 weight parts of a soap of a disproportionated hydrogenated rosin containing dehydro-, dihydro-, and tetrahydroabietic acids, 0.026 weight part potassium hydroxide, 0.128 weight part potassium chloride, 0.026 weight part sodium salt of condensed alkyl aryl sulfonic acid, 0.09 weight part potassium pyrophosphate, 0.072 weight part ferric sulfate hydrate, 0.05 weight part diisopropylbenzene hydroperoxide, and 3.85 weight parts tert-dodecyl mercaptan; continuing the polymerization at 41° F. until at least 70 percent conversion of the last added butadiene is obtained thereby producing a polymer which would have a Mooney ML-4 value at 212° F. not exceeding 20; and recovering the resulting polymer.

14. A process for producing a plasticized synthetic rubber which comprises polymerizing butadiene in aqueous emulsion to at least 90 percent conversion and a Mooney ML-4 value at 212° F. in excess of 70 and then polymerizing additional butadiene in aqueous emulsion to at least 70 percent conversion and a Mooney ML-4 value at 212° F. less than 20 in the presence of the resulting latex of the first said polymerization and recovering the thus polymerized butadiene.

References Cited in the file of this patent
UNITED STATES PATENTS 2,623,032    Banes et al. _____ Dec. 23, 1952